P. SCHAU.
Grain Seeder.
No. 229,013.  Patented June 22, 1880.
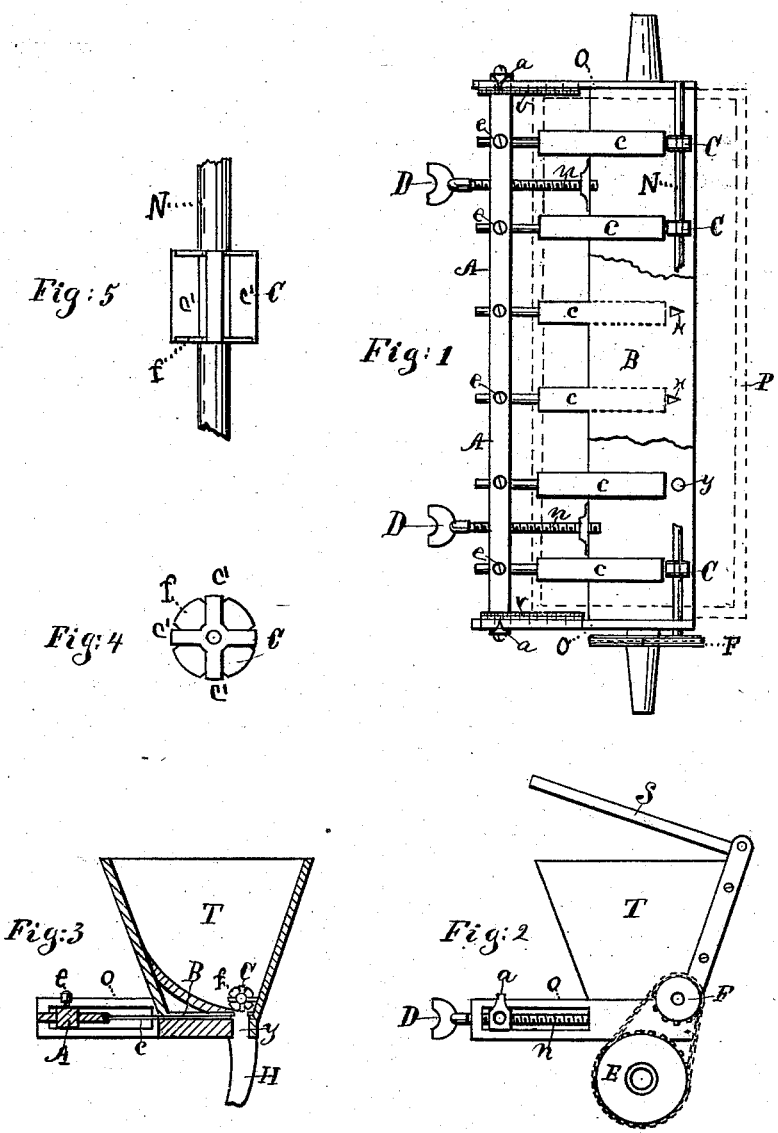

UNITED STATES PATENT OFFICE.

PHILLIP SCHAU, OF COOPER, ASSIGNOR OF ONE-HALF OF HIS RIGHT TO JULIUS SCHUSTER, OF KALAMAZOO, MICHIGAN.

GRAIN-SEEDER.

SPECIFICATION forming part of Letters Patent No. 229,013, dated June 22, 1880.

Application filed February 24, 1880.

*To all whom it may concern:*

Be it known that I, PHILLIP SCHAU, of Cooper, county of Kalamazoo, State of Michigan, have invented new and useful Improvements in Grain-Seeders, of which the following is a specification.

My invention relates to improvements in grain-seeders constructed with force-feeds, and is also intended to supplant the devices in certain drills known as "agitators." It also relates to improvements in devices for controlling the amount of grain sown per acre.

My invention has for its objects, first, the construction of improved rotating feeders to facilitate greater accuracy in forcing the grain into the drill cups or tubes, thus distributing it with greater evenness in the soil; and, second, to control the drill by the device constructed to gage the amount of grain sown per acre, so that any given portion of the same shall fail to distribute grain at the option of the operator.

In the accompanying drawings, forming a part of this specification, in which similar letters of reference indicate like parts, Figure 1 shows a top view of the feeders and the gates as located in the drill; Fig. 2, an end view of a seeder or drill, showing the gearing of the feeders with the power or axle pulley; Fig. 3, a cross-sectional view of a seeder, showing my location of feeder and gate; Fig. 4, end view of one of the feeders, looking against the inner face of the inclosure of one end, the other end being removed; and Fig. 5, top view of a feeder secured to its shaft.

T shows the grain-box, with cover S, usually used in drills, beneath which the tubes for conveying the grain to the soil are illustrated at H in Fig. 3. Through the bottom of box T holes are made, in the usual manner, corresponding to the number of drill-teeth used, (illustrated at *x x* and *y* in Fig. 1,) box T in said figure (shown by dotted lines P) being removed, all but its bottom inclosure, through which the holes are made.

The broken portion B shows a metal lining to the bottom of the box, between which lining and the lower bottom inclosure gates *c c* are located. These gates are held in position by bar A, through which one end extends, where they are held by set-screws *e e*. Said gates are operated by threaded screws D D, which pass through threaded holes in bar A, their inner ends, *n n*, being swiveled to the bottom of box T.

At each end of box T are located slotted bars O, in which slots each end of bar A is located and moves. On the upper face of these bars O are graduated scale-plates V, on which indicator-points *a* move, the same being fastened to the ends of bar A.

With this construction, by turning screws D bar A is moved toward box T, by which means the gates *c c* are shut over holes *x x* partially or entirely, the indicator-points *a* designating on scale-plates V the amount of grain sown per acre.

By means of set-screws *e e* such gates as desired may be entirely closed, as in case a strip of land half the width of the seeder should be left in finishing a field, half the gates may be shut and said strip sown without resowing any portion of the land already seeded.

C C are the feeders, secured to shaft N, which extends lengthwise through box T, near its bottom, at one end of which shaft N is a pulley-wheel, F, carrying a gear-chain, which surrounds it and axle-pulley E, by which means shaft N, with its feeders C C, is made to revolve. These feeders C are stationed on the shaft N over each hole *x x*, as shown at C in Fig. 3. The feeders are constructed with cups formed by partitions *c'*, and closed at their ends by notched circular end pieces, *f*. The object of the ends of cups being inclosed is, that the grain which fills them is all retained until forced through holes *x x* by partitions *c'* as they revolve.

The advantage of these feeders over other styles and over agitators will be readily understood by partially filling the grain-box T with grain, when cups in feeders C which are uppermost will be filled with grain, and as the feeders revolve the filled ones will force their contents through the holes beneath, while the empty ones will be filling, and so on; and, as before stated, by their retaining all the grain in them, by means of closed ends, until forced through holes *x x*, evenness in the amount of grain distributed over the ground is absolutely established.

The object in notching the ends $f$ of the feeders is to catch any straw that might happen to come in contact with them.

Deeming no further description of its operation necessary,

What I claim as new and desire to secure is—

1. A feed-wheel to a grain-drill having longitudinal partitions or leaves $c'$, said feed-wheel being constructed with notched circular end inclosures, $f$, whereby all straw and like substances are kept cleared from the discharge-orifice and greater evenness in the distribution of grain is effected, all as shown and described.

2. In a grain-drill, slotted bars O O, secured to each end of the drill-frame bar A, gates $c\ c$ extending through said bar A and held by adjusting-screws $e\ e$, screws D D engaging the drill-frame and bar A, all said parts being combined and constructed as set forth, for the two purposes specified.

PHILLIP SCHAU.

Witnesses:
JOHN GALLIGAN,
H. UNDERWOOD.